United States Patent [19]
Saito

[11] 3,778,842
[45] Dec. 11, 1973

[54] PRINTER
[75] Inventor: Etsuro Saito, Yokosuka, Japan
[73] Assignee: Sony Corporation, Tokyo, Japan
[22] Filed: Sept. 27, 1971
[21] Appl. No.: 184,124

[30] Foreign Application Priority Data
Sept. 29, 1970 Japan .............................. 45/85450

[52] U.S. Cl. .......... 346/136, 346/74 SB, 346/139 R
[51] Int. Cl. ...................... G01d 15/28, G01d 15/24
[58] Field of Search .......... 346/139 R, 136, 74 CH, 346/74 E, 74 ES, 74 S, 74 SC, 74 SB, 145, 117 A

[56] References Cited
UNITED STATES PATENTS

| | | | |
|---|---|---|---|
| 2,355,502 | 8/1944 | Barton | 346/139 R |
| 2,706,672 | 4/1955 | Cooley | 346/136 |
| 2,812,997 | 11/1957 | Diekmann et al | 346/139 R |
| 3,389,402 | 6/1968 | Rosmanith | 346/145 X |
| 3,644,931 | 2/1972 | Roland | 346/139 R X |
| 3,139,320 | 6/1964 | Johnson | 346/145 |

Primary Examiner—Joseph W. Hartary
Attorney—Lewis H. Eslinger et al.

[57] ABSTRACT

A recording medium is wound on a roller shaft, a feed roller feeds the recording medium in a predetermined direction, a recording head assembly records information signals on the recording medium and a drive mechanism drives the recording head assembly to scan the recording medium. A spring is provided between the roller shaft and the feed roller to urge them to contact each other.

4 Claims, 20 Drawing Figures

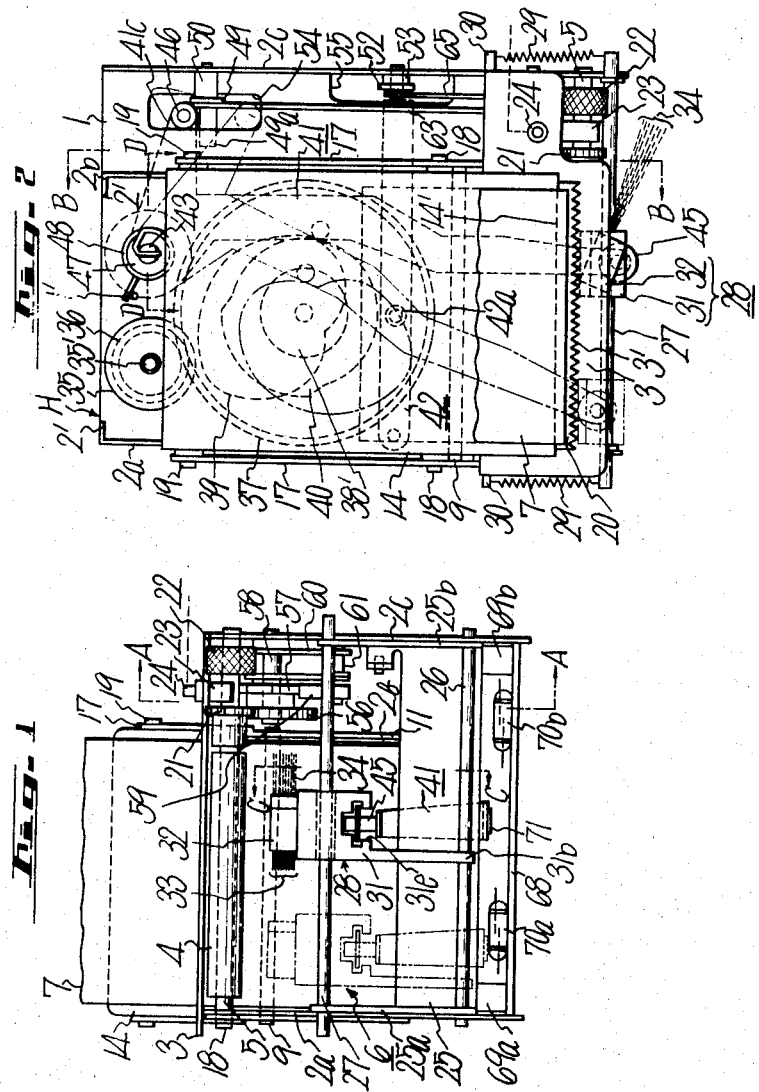

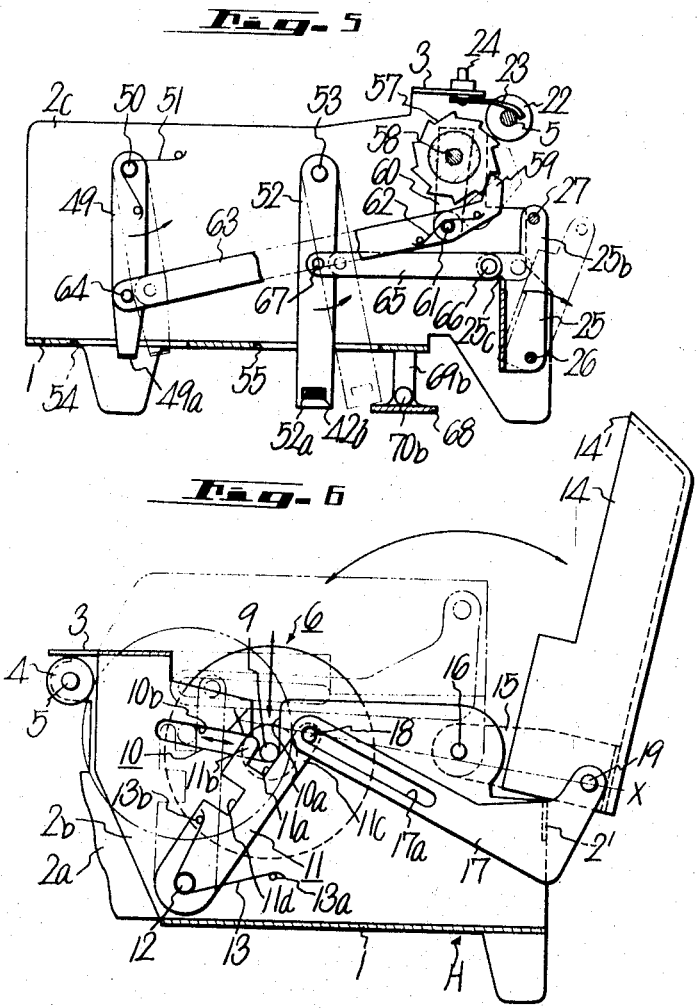

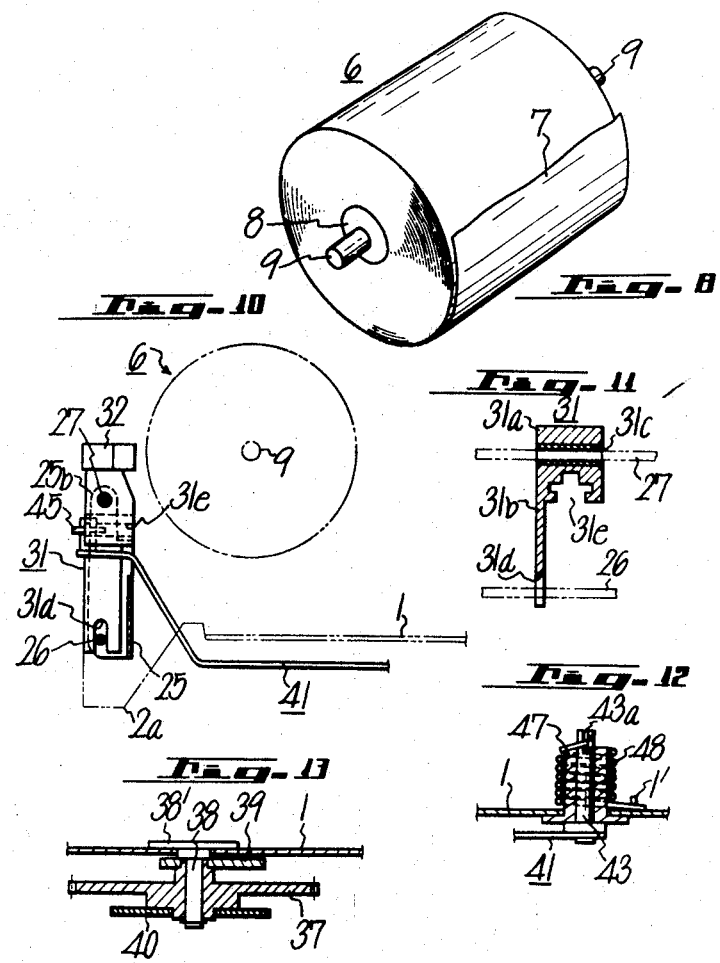

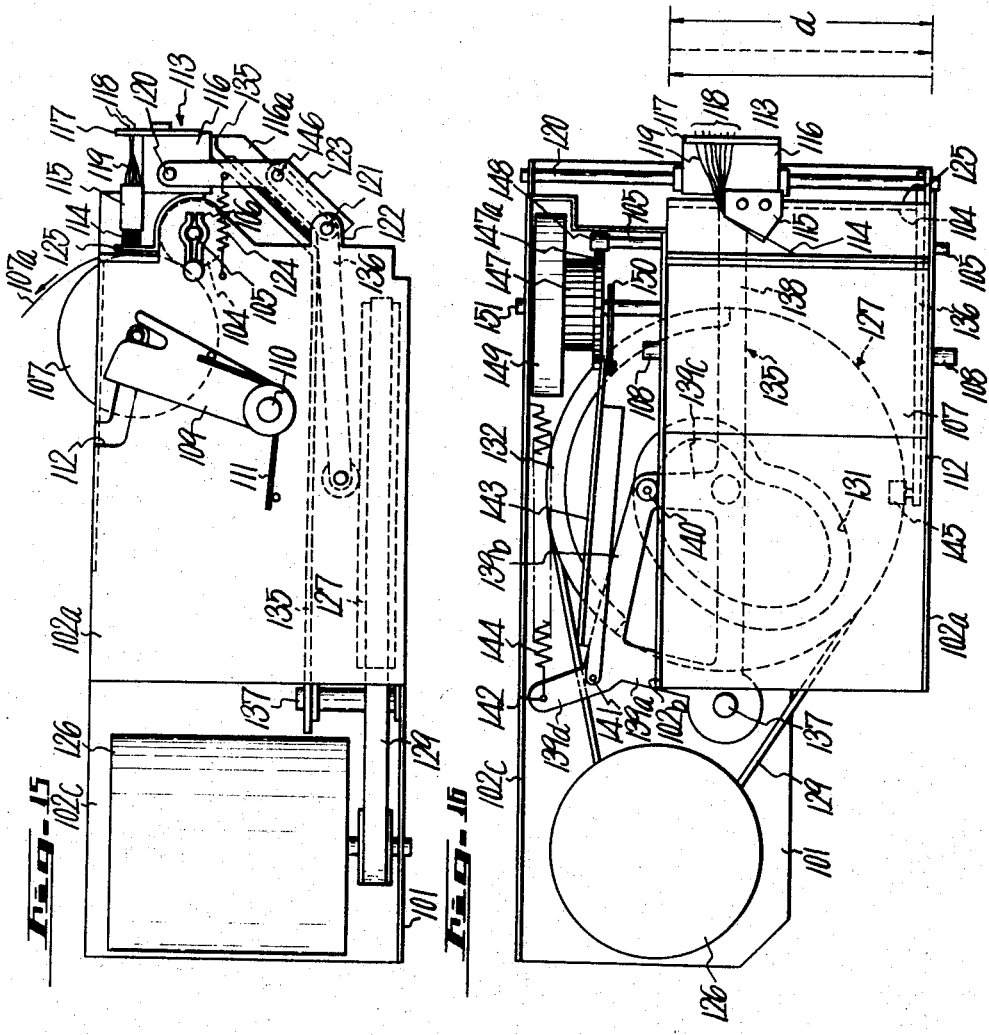

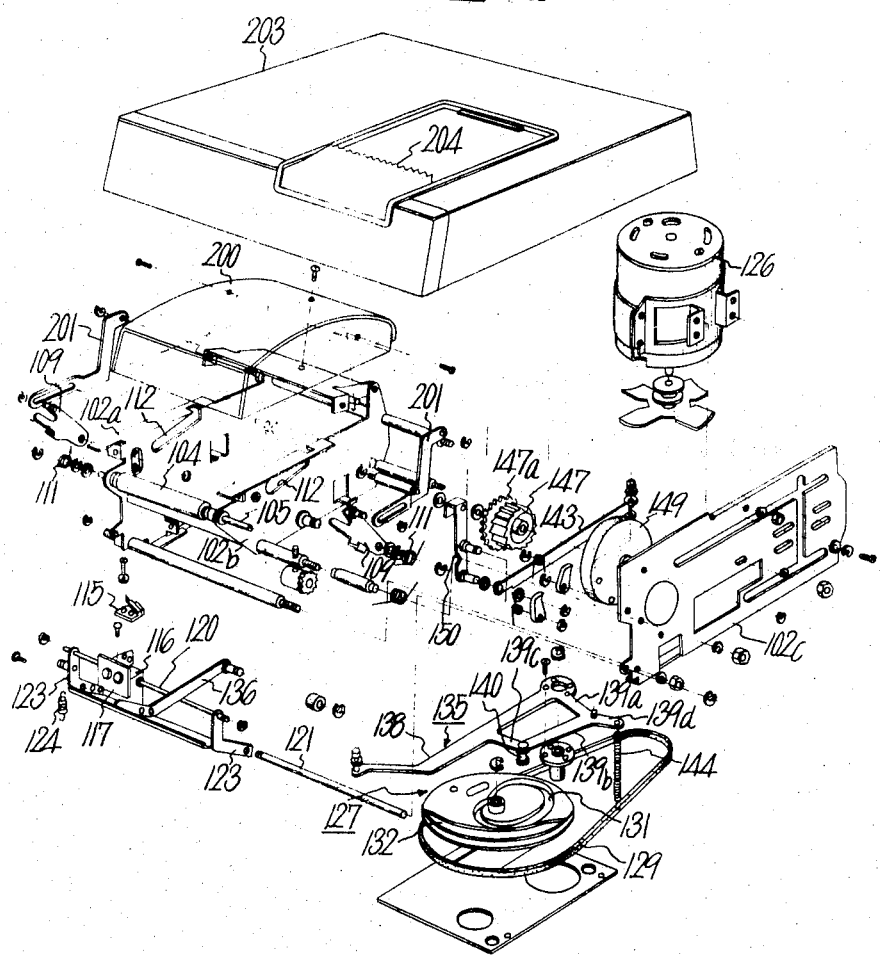

PRINTER

BACKGROUND OF THE INVENTION

1. Field of the Invention

This invention relates to a printer, and more particularly to a printer in which information signals are recorded by a recording head on a rolled recording paper with high speed.

2. Description of the Prior Art

There has been proposed and put into practical use a printer for data processing which is of the type that predetermined letters, numerals or figures are recorded by discharge, heating or electronically on a recording medium in one or more lines per unit of time. In such a printer a recording head must be controlled to scan the recording medium for recording information signals thereon. To perform this, it is the practice in the prior art that the recording head is slidably mounted on a rotary shaft having a complicated cam groove and that the shaft is driven by a motor to cause the recording head to scan the recording medium in a predetermined direction. During the recording stroke of the head (a head motion in a forward direction for recording), the recording head must be held in contact with the recording medium but during the return stroke of the head (a head motion in a reverse direction toward its starting position) the head must be held out of contact with the recording medium. For returning the recording head to its starting point, an electromagnet and other complicated means have heretofore been employed. Further, in order that the recording medium wound on a roller shaft may be drawn out in a predetermined direction, the prior type printer adopts a method such that the recording medium is passed between a pair of feed rollers at least one of which is supplied with a drive force. However, such a method involves at least one pair of feed rollers, and hence inevitably leads to bulkiness of the printer itself.

SUMMARY OF THE INVENTION

The present invention of a printer comprises a housing, a recording medium rotatably mounted in the housing, a recording head means for recording information signals on the recording medium, and means for causing the recording head means to scan the recording medium. The scanning means includes means for reciprocating the recording head means in a substantially straight line and means for engaging the recording head means with the recording medium for recording the information signals thereon during a head motion in a forward direction and for disengaging the recording head means from the recording medium during a head motion in a reverse direction. The recording medium is transported by feed roller means which contact the recording medium and by means for driving the feed roller means which draws out the recording medium from the housing when the recording head means is moved while being held out of contact with the recording medium.

In one preferred embodiment the drive means includes a rotatable first cam and the scanning means includes a first arm engaged with the first cam and connected to the recording head means, so that movement of the recording head means is caused by the rotation of the first cam to perform a straight reciprocating motion through the first arm. The drive means further includes a second cam and the scanning means also further includes a second arm engaged with the second cam and connected to the recording head means, so that the recording head means is brought by the rotation of the second cam into contact with the recording medium through the second arm during the forward motion of the recording head means and is brought out of contact with the recording medium during the reverse motion of the recording head means.

In the first preferred embodiment the recording head means further includes a support member slidably mounted on a rod fixed to the housing accommodating the recording medium and a recording head fixed to the support member, the first and second arms being coupled to the support member apart from the rod. The recording medium has a recording paper and a conductive layer and the recording head means has needle electrodes and the conductive layer is supplied with a current through the feeding means to thereby record information marks on the recording paper.

The primary object of this invention to to provide an improved printer.

Another object of this invention is to provide a printer in which a recording medium can be fed in a predetermined direction by the provision of at least one feed roller.

Another object of this invention is to provide a printer in which a feed roller for feeding a recording medium in a predetermined direction and the recording medium wound on a roller shaft are held in good contact with each other regardless of the diameter of convolution of the recording medium to ensure stable feeding thereof.

Another object of this invention is to provide a printer in which scanning of a recording head on a recording medium can be readily achieved by the combined use of cams and actuating arms.

Another object of this invention is to provide a printer in which a recording medium can be readily set up in a printer housing.

Still another object of this invention is to provide a printer which is small in size, easy to handle and inexpensive.

Other objects, features and advantages of this invention will be more readily understood from the following description taken in conjunction with the accompanying drawings.

BRIEF DESCRIPTION OF THE DRAWING

FIG. 1 is a front view of a printer produced according to this invention;

FIG. 2 is a plan view of the printer exemplified in FIG. 1;

FIG. 5 is a cross-sectional view taken along the line A—A in FIG. 1;

FIG. 6 is a cross-sectional view taken along the line B—B in FIG. 2 with its cover being lifted and its head assembly being left out for the sake of simplicity;

FIG. 8 is a perspective view of a recording medium wound on a roller shaft;

FIG. 10 is a fragmentary cross-sectional view taken along the line C—C in FIG. 1;

FIG. 11 is a longitudinal sectional view showing a sliding member;

FIG. 12 is a fragmentary cross-sectional view taken along the line D—D in FIG. 2;

FIG. 13 is a cross-sectional view of a gear bearing portion;

FIG. 15 is a side view schematically illustrating another example of the printer of this invention;

FIG. 16 is a schematic plan view of the printer exemplified in FIG. 15;

FIGS. 17 and 18 are both exploded perspective views showing the principal part of the printer of FIG. 15;

DESCRIPTION OF THE PREFERRED EMBODIMENTS

Figure 3:
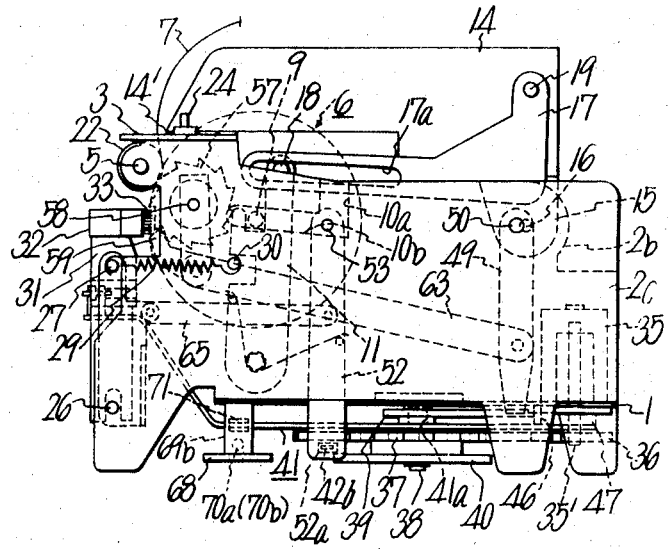
FIG. 3 is a right side view of the printer of FIG. 1.

One example of this invention will be described in detail. In FIGS. 1 to 7, a printer housing H consists of a bottom plate 1, side panels 2a, 2b and 2c bent upwardly from the bottom plate 1 and a front panel 3 attached to the upper edges of the side panels. In the present example these members are formed as a unitary structure of a sheet metal. A roller shaft 5, which is rotatably supported by the side panels 2a and 2c in proximity to the front panel 3, has mounted thereon a feed roller 4. The feed roller 4 is molded of conductive rubber. The feed roller and its associated members will be described later on.

Reference numeral 6 indicates generally a roll of recording paper which is supported by the side panels 2a and 2b and whose periphery is snugly urged against the feed roller 4. The so-called conductive recording paper 7 of a predetermined width is wound on a roll 8, which is provided with shafts 9 projecting out from both end faces thereof as shown in FIG. 8. The recording paper 7 is of a known type, with which a plurality of needle electrodes are held in contact for recording. When supplied with currents from the needle electrodes, the recording paper 7 is heated or electrolyzed or blown off to form tiny holes at the contacting points of the recording paper with the needle electrodes, thereby to provide visible information. The present example employs a recording paper such that its base is colored and then deposited with a conductive film as of aluminum. Supplied with currents from the needle electrodes, only the aluminum film is fused instantaneously to form an image with dots corresponding to the needle electrodes.

Figure 4:
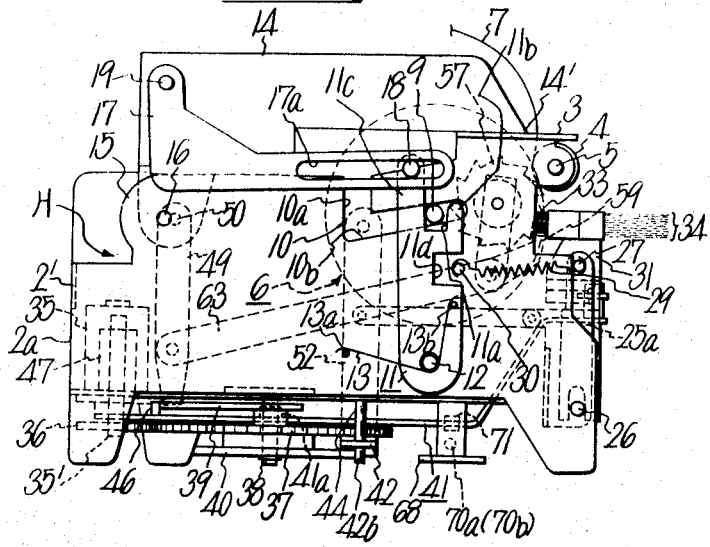
FIG. 4 is a left side view of the printer of FIG. 1.

As shown in FIGS. 4 and 6, the panels 2a and 2b have respectively formed therein substantially L-shaped guide notches 10, each consisting of a vertical notch 10a which is open to the upper edge of the side panel and a horizontal notch 10b which extends a little upwardly from the vertical notch 10a by a predetermined length towards the forward portion of the side panel. Further, the side panels 2a and 2b are respectively provided with pivots 12, which have mounted thereon pushing arms 11 respectively. The arms 11 are mounted on the outsides of both the side panels 2a and 2b symmetrically with each other together with intercoupling links described later on. The guide notches 10 mentioned above receive the shafts 9 of the roll 8 with the recording paper 7 wound thereon. The paper roll 6 may be loaded in position by inserting its shafts 9 into the guide notches 10 from its vertical notches 10a (FIG. 6). Further, each of the arms 11 has formed therein a notch 11a extending down from the upper edge thereof, which receives the shaft 9. That is, under the conditions depicted in FIG. 6, the shaft 9 is rested on the bottom of the vertical notch 10a and positioned in the notch 11a. In order to bring the paper roll 6 into such a condition, a side piece 11b of the arm 11 forwardly of the notch 11a is formed shorter than a side piece 11c rearwardly of the notch 11a.

Further, as depicted in FIGS. 4 and 6, pins 13a and 13b are planted on each of the side panels 2a and 2b and each of the arms 11 respectively and a bias means, in this case, a coiled spring 13 is provided between the pins 13a and 13b with the pin 12 therebetween for biasing the arm 11 towards the feed roller 4. Under such conditions, when the arm 11 is turned by the coiled spring 13 in the direction of the feed roller 4, the shaft 9 is moved forward, guided by the horizontal notch 10b to bring the surface (the recording surface) of the recording paper 7 into contact with the circumferential surface of the feed roller 4 (FIG. 2) and the recording paper 7 is always urged by the arm 11 against the feed roller 4 at a suitable pressure irrespective of variations in the diameter of the convolution of the recording paper 7.

Referring again to FIGS. 4 and 6, a cover 14 of a U-shaped cross section for covering the upper open end portion of the housing H is attached to the side panels 2a and 2b through a support frame 15 secured to the inside of the backward portion of the cover 14 and hinged about pins 16. In FIG. 6 the printer housing H is shown by solid and chain lines to be in its opened and closed conditions. When the printer housing H is open, the rear edge portion is rested on projections 2' of the side panels. The aforementioned link 17 is pivoted by a pin 19 to the support frame 15 in proximity to the cover 14 from the outside thereof. The link 17 is substantially L-shaped and has an elongated opening 17a formed in its longer arm portion for engagement with a guide pin 18 planted on the extremity of the rear side piece 11c of the arm 11 to interconnect the cover 14 and the arm 11.

With reference to FIG. 6 a description will be given of associated operations of the arm 11, the cover 14 and the link 17. When the cover 14 is lifted, the arm 11 is turned clockwise through the link 17 to permit loading (or unloading) of the rolled recording paper 7. Under such conditions, the line X—X joining the pin 19 of the link 17 with the guide pin 18 lies below the center of the pin 16 of the support frame 15. That is, the cover 14 rested on the projections 2' of the side panels 2a and 2b is held in its lifted position. It will be readily understood that, turning the cover 14 to cover the printer housing H, when the aforementioned line X—X has passed the pin 16, the cover 14 is pulled by the biasing force of the arm 11. Namely, pushing the cover 14 forwardly simultaneously with loading of the rolled recording paper 7, the cover 14 is snapped down to cover the housing H and, at the same time, the rolled recording paper 7 is also pushed forward by the forward movement of the shafts 9. Between the front edge 14' of the cover 14 and the front panel 3 there is defined a gap 20 (refer to FIG. 2), through which the recording paper 7 is drawn out intermittently and at a constant pitch by a drive means described hereinafter. In order to cut the recording paper 7 to a desired length, the edge of the front panel 3 is indented to provide a blade 3'. However, it is a matter of course that such a blade may be provided separately.

In FIGS. 4 and 6 the arm 11 is shown to have a notch 11d in its front marginal portion which serves as a relief from a pin having affixed thereto one end of a spring described later on. However, such a notch 11d need not be formed in the arm mounted on the side plate 2b but in the present example two arms punched in the same configuration are employed symmetrically.

A recording means and more particularly, a scanning mechanism, will now be described.

In the foregoing, the feed roller 4 and the roller shaft 5 have been outlined. The roller shaft 5 is supported by the side panels 2a and 2b (bearings therefor not shown) while being electrically insulated therefrom. The right-hand portion of the roller shaft 5 has mounted thereon a pinion 21 adjacent to the feed roller 4 and a manual feed knob 22 on the side of the side panel 2c, between which a spring brush 23 as of phosphorous bronze sheet is held in contact with the roller shaft 5 (refer to FIG. 5), the spring brush 23 being electrically connected with a terminal 24 mounted on the upper surface of the front panel 3. Further, a head support frame 25, which is U-shaped in cross-section and whose side pieces 25a and 25b extend upwardly, is disposed inside of the side panels 2a and 2c. The support frame 25 is provided with a lower guide rod 26 which is passed through the side pieces 25a and 25b and secured at both ends to the side panels 2a and 2c and about which the support frame 25 is turned and an upper guide 27 is bridged between the upper portions of the side pieces 25a and 25b. A recording head assembly 32 is slidably supported by the guide rods 26 and 27 and springs 29 are secured at one end to both of the projecting portions of the upper guide rods 27 and at the other end to pins 30 planted on the outside of the side panels 2a and 2c, thereby to bias the head support frame 25 rearwards, and in order to limit the rearward movement of the support frame 25, both of the projecting ends of the guide rod 27 are rested on the front edges of the side panels 2a and 2c.

The recording head assembly 28 consists of a sliding member 31 guided by the upper and lower guide rods 27 and 26 to move thereon to right and left in FIG. 1 and a head 32 mounted on the sliding member 31. In the present example, the head 32 is obliquely mounted on the sliding member 31 as shown in FIG. 2 and the front of the head 32 has attached thereto, for example, nine needle electrodes 33. From the back of the head 32 are led out coated lead wires 32 (indicated by broken lines for convenience of illustration) which are connected to the needle electrodes 33 respectively. These lead wires 34 are sufficiently flexible and disposed in a manner not to interfere with the reciprocating motion of the recording head assembly 28. The needle electrodes 33 are the same length and suitably spaced from one another and are adapted to be urged against the surface of the recording paper 7 at a predetermined pressure during the recording stroke of the head, that is, the head motion in the forward direction for recording.

A mechanism is provided for the reciprocating motion of the recording head assembly 28. That is, in FIGS. 2, 3, 4 and 7, a motor 35 is mounted on the bottom plate 1 and a pinion 36 is affixed to a shaft 35' of the motor 35 and meshed with a gear 37. The gear 37 is rotatably mounted on a gear support shaft 38 fixed on the bottom plate 1 (refer to FIG. 13) and bosses of the gear 37 formed on its upper and lower surfaces have fixed thereto a main cam 39 and an auxiliary cam 40 which are spaced a predetermined distance apart from each other. The gear support shaft 38 has a flange 38' at its top end, which is attached to the upper surface of the bottom plate 1 so that the shaft projects down through the bottom plate 1. The main and auxiliary cams 39 and 40 are both plane cams, namely peripheral cams and adapted to cause their cam followers to follow their curved peripheral surfaces and the phases of the cams 39 and 40 are also selected as desired.

Figure 7:
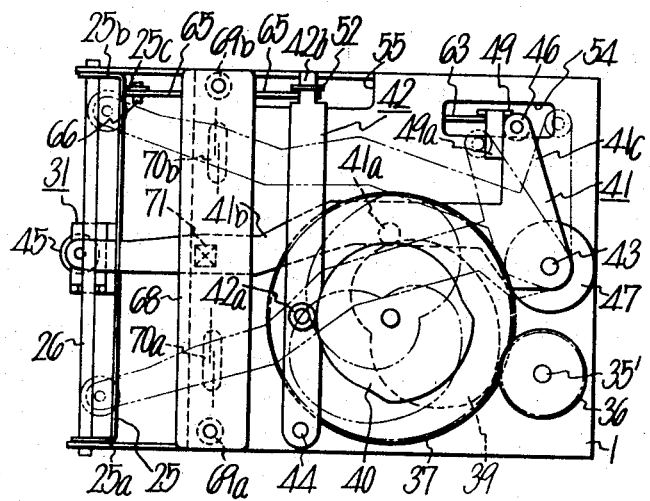
FIG. 7 is a bottom view of the printer depicted in FIG. 1, showing its head scanning mechanism.
Figure 9:
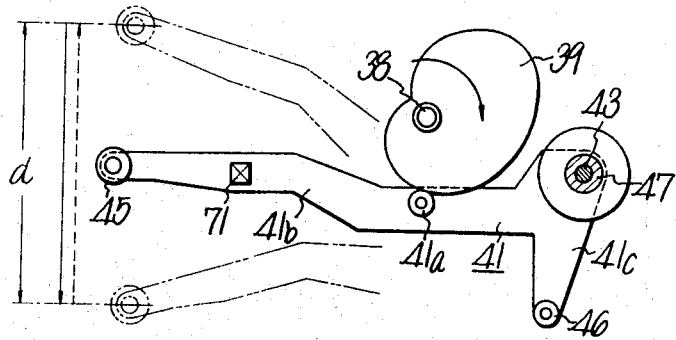
FIG. 9 is a plan view showing the relationship between a scanning arm and a main cam.

In FIGS. 7 and 9 reference numeral 41 indicates a scanning arm which is a cam follower of the main cam 39 and a head releasing arm 42 which is a cam follower of the auxiliary cam 40 and crosses the arm 41 substantially at right angles thereto. These arms 41 and 42 have mounted thereon rollers 41a and 42a respectively, which are urged against the peripheral surfaces of the cams 39 and 40 respectively, so that the scanning arm 41 is turned about a pivot 43 mounted at the back portion of the bottom plate 1 and the head releasing arm 42 is turned about a pivot 44 planted on the bottom plate 1.

The scanning arm 41 included of a main lever 41b associated with the aforementioned sliding member 31 and an auxiliary lever 41c for actuating a rocking lever described later on. The main lever 41b is bent up near its free end portion and the free end portion is, in turn, bent (refer to FIG. 10), on which a guide member 45 is mounted. A roller 46 is attached to the free end of the auxiliary lever 41c. Further, a magnet 71 is mounted on the main lever 41b in the vicinity of its bent portion.

The aforementioned sliding member 31 included a block 31a carrying the head 32 and a plate-like member 31b extending down from the left-hand portion of the block 31a as viewed in FIGS. 1 and 11. A sleeve 31c, into which the upper guide rod 27 can be smoothly inserted, is forced into the block 31a in a direction perpendicular to the plate-like member 31b and a U-shaped groove 31d is formed in the plate-like member 31b for receiving the lower guide rod 26 with a little play. Further, the block 31a has formed therein a substantially cross-shaped slide groove 31e which is open to the underside of the block 31a and the guide member 45 of the scanning arm 41 is inserted into the slide groove 31e. Namely, the guide member 45 is shaped to conform to the slide groove 31e and is slid therein back and forth to guide the sliding member in response to the movement of the scanning arm 41. That is to say, the movement of the scanning arm 41 is a rotational one, which is converted into a straight motion by the guide rods 26 and 27 and the slide groove 31e of the sliding member 31.

Figure 14:
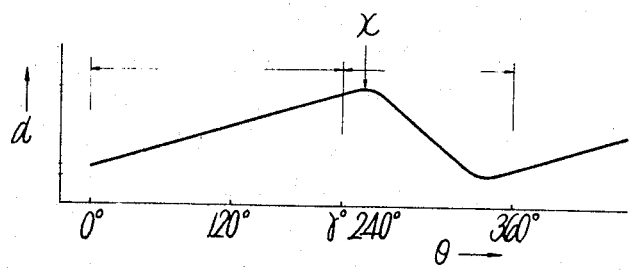
FIG. 14 is a graph showing the relationship between the movement of the recording head and the rotational angle of the main cam.
Figure 18:
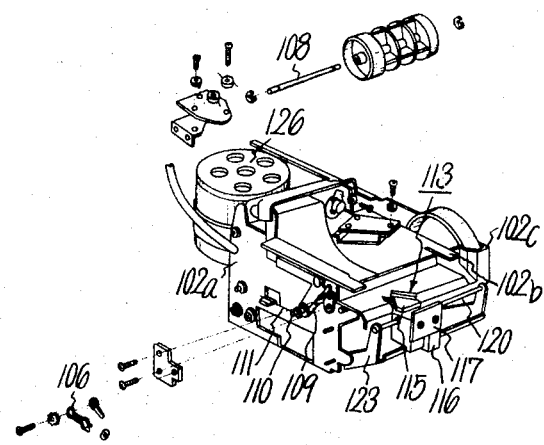

FIG. 9 shows the relationship between the main cam 39 and the scanning arm 41. During one cycle (one rotation) of the main cam 38 the guide member 45 mounted on the free end of the main lever 41b performs a reciprocating motion over a straight distance d as indicated by solid and broken lines (but the starting point of the motion is set separately). This reciprocating motion is converted into that of the scanning head assembly 28 through the sliding member 31 but the main cam 39 is designed based on such conditions as depicted in FIG. 14, in which the abscissa represents the rotational angle $\theta$ of the main cam 39 and the ordinate the aforementioned distance $d$. The reciprocating motion of the main cam 39 during one cycle is divided into a straight and uniform recording motion and a sinusoidal returning motion and the recording motion is stopped at $\gamma°$ in the vicinity of 240° and the starting point of the reciprocating motion is established at about 240° (indicated by an arrow $X_0$. As is apparent from FIG. 14, the recording motion is a uniform one and that the returning motion is smooth and quick. The reciprocating motion initiating point $X_0$ will hereinbelow be described.

The bearing structure of the pivot 43 of the scanning arm 41 is such as depicted in FIGS. 2 and 12. The pivot 43 is inserted into a flanged cylindrical bearing 47, both of which are exposed on the bottom plate. The pivot 43 projects out a little from the upper end of the bearing 47. A slit 43a for retaining one end of a spring is formed in the projecting end of the pivot 43 and a coiled spring 43 is loosely wound on the bearing 47 and retained at its upper end in the slit 43a. The lower end of the spring 47 is retained by a tab 1' of the bottom plate 1, to thereby bias the scanning arm 41 clockwise as viewed in FIG. 2. Thus, it will be understood that the starting point $X_0$ is so selected as to promote the starting torque of the motor 35 with the biasing force of the scanning arm 41 at the starting of the reciprocating motion.

As shown in FIGS. 5 and 7, a first rocking lever 49, which is pivotally mounted by a pin 50 on the upper portion of the side panel 2c, is bent inwardly at right angles at its lower end portion to provide a tab 49a. The tab 49a engages the roller 46 of the scanning arm 41 as shown in FIG. 7. The rocking lever 49 is biased by a coiled spring 51 clockwise as viewed in FIG. 5. A second rocking lever 52 is journalled by a pin 53 to the side panel 2c and has a rectangular opening 52a formed in its lower portion. Since the tab 49a is engaged with the roller 48 of the scanning arm, the first rocking lever 49 is turned counter-clockwise through a predetermined angle in the direction of an arrow as viewed in FIG. 5 when the scanning arm 41 is returned. Further, an engaging piece 42b formed at the free end portion of the aforementioned releasing arm 42 is inserted into the rectangular opening 52a of the second rocking lever 52 and when the releasing arm 42 is turned by the auxiliary cam 40, the second rocking lever 52 is also turned through a predetermined angle in the direction indicated by the arrow in FIG. 5. The first and second rocking levers 49 and 52 project downwardly through holes 54 and 55 in the bottom plate 1.

Referring now more particularly to FIG. 1, a gear 56 is meshed with the pinion 21 of the roller shaft 5, by which the roller shaft 5 is intermittently driven through the pinion 21. A ratchet wheel 57 formed integrally with the gear 56 and the ratchet wheel 57 and the gear 56 are rotatably mounted on a shaft 58 secured to the side panel 2c and a pawl 59 is engaged with the ratchet wheel 57, as shown in FIGS. 1 and 5. An inverted U-shaped rocking piece 60 is mounted on the shaft 58, a pin 61 is attached to the lower end of the rocking piece 60 and the base of the pawl 59 is pivoted to the pin 61. A bias spring 62 is secured at its middle to the pin 61 and at its ends to a link 63 which interconnects the pin 61 with the first rocking lever 49. The turning of the rocking lever 49 is thus converted into intermittent rotation of the ratchet wheel by the pawl 59. This intermittent rotation of the ratchet wheel 57 is transmitted to the pinion 21 through the gear 56, so that the feed roller 4 coaxial with the pinion 21 pays out the recording paper 7 intermittently and at a constant pitch. Reference numeral 64 indicates a pin on the rocking arm 49 to which is pivoted the link 63.

Further, a coupling piece 25c is formed on the head support frame 25 near its side piece 25b and is coupled with the second rocking lever 52 through a link 65 which is pivoted by a pin 67 to the rocking lever 52 and by a pin 66 to the piece 25c. When the rocking lever 52 turns, the head support frame 25 turns about the lower guide rod 26 in a clockwise direction, that is, in the direction indicated by an arrow as viewed in FIG. 5.

In FIGS. 1, 3, 5 and 7 reference numeral 68 represents a terminal plate attached to the bottom plate 1 with spacers 69a and 69b interposed therebetween near the front edge of the bottom plate 1. Reed switches 70a and 70b are disposed on the terminal plate 68 at right and left predetermined positions. These reed switches are closed by the magnet 71 mounted on the scanning arm 41 and for detecting the recording initiating and terminating positions of the scanning head assembly 28. The detected signals are transmitted to a computer.

The foregoing description has been with respect to the construction of the printer mechanism of this invention. The following description will be made in connection the recording operations of the printer of this invention.

The printer is associated with a computer and the motor 35, the terminal 24 for impressing a power source voltage to the recording paper 7, the reed switches 70a and 70b etc., are connected to predetermined electric circuits and the lead wires 34 of the recording head assembly 28 are connected to the recording circuits of the computer. The rolled recording paper 7 is loaded in the recording device in the manner previously described. In this case, the recording paper 7 is initially paid out through the gap 20 by turning the knob 22. The computer is then operated as predetermined to set the printer in its recording condition to close the circuit of the motor 35. When the motor 35 is thus energized, the rotation of the shaft of the motor 35 is transmitted to the main and auxiliary cams 39 and 40 through the gear 37. When the roller 41a of the scanning arm 41 engages the main cam 39 at the smallest diameter portion thereof, the head assembly lies at the left-hand end on the guide rods 26 and 27 as viewed in FIG. 2. With clockwise turning of the main cam 39, the scanning arm turns anticlockwise, by which the scanning head assembly 28 is also moved on the guide rods 26 and 27 from left to right.

At this time, voltages corresponding to signals from the computer are impressed between the individual needle electrodes 33 and the recording paper 7 to cause a discharge therebetween, to thereby to record on the recording paper 7, letters, marks and the like corresponding to the signals. In the case that the smallest diameter portion of the main cam 39 engages its cam follower, the rotational angular position of the main cam 39 is 0° as shown in FIG. 14, and recording is achieved from the 0° position to that spaced $\gamma°$ apart therefrom. As will be seen from FIG. 14, the diameter of the cam 39 varies linearly. During recording, the diameter of the auxiliary cam 40 does not change. When the roller 41a of the arm 41 turns into contact with the largest diameter portion of the main cam 39, the larger diameter portion of the auxiliary cam 40 turns into contact with the roller 42a of the releasing arm 42. Accordingly, the releasing arm 42 is turned by the auxiliary cam 40 to left in FIG. 7, by which the rocking lever 52 is turned clockwise through the top end portion 42b of the arm 42 as indicated by the phantom line in FIG. 5. The link 65 coupled to the lever 52 moves to right in FIG. 5 to turn the head support frame 25 clockwise about the guide rod 26, thus disengaging the head assembly 28 from the recording paper 7. The largest diameter portion of the auxiliary cam 40 is selected to cover the range in which the diameter of the main cam 39 varies from its maximum to minimum value.

Since the change in the diameter of the main cam 39 from the maximum to the minimum is abrupt as shown in FIG. 14, the scanning arm 41 rapidly turns clockwise in FIG. 2 and consequently the head assembly 28 is brought from right to left as shown in FIGS. 1 and 14. During this leftward movement the head assembly 28 is held out of contact with the recording paper by the actions of the auxiliary cam 40 and the link 65. During the returning stroke of the head assembly 28, the auxiliary arm 41c of the scanning arm 41 turns clockwise as depicted in FIG. 2, so that the roller 46 abruptly pushes down the projection 49a of the first rocking lever (to left in FIG. 5) and the ratchet wheel 57 is thereby turned by one pitch through the pawl 59 associated with the link 63. The arm 41 engaging the smallest diameter portion of the main cam 39 through the roller 41a is so moved as to bring the head assembly 28 from the left-hand end to the right-hand end and the auxiliary cam 40 returns the lever 42 to its initial position to bring the head assembly 28 into contact with the recording paper 7.

The foregoing operations are repeatedly carried out for recording information on the recording paper and the diameter of convolution of the recording paper 7 decreases with the progress of the recording. In the present invention, however, either one of the roller shafts 9 of the recording paper 7 is always biased by the spring 13 through the arm 11 in the direction of the feed roller 4 to ensure that the recording paper 7 is always held in good contact with the feed roller 4. Consequently, the recording paper 7 is paid out in a predetermined direction irrespective of the diameter of its convolution. Thus, the recording paper 7 is paid out by the peripheral surface of the feed roller 4 as previously described. Of course, the amount of the recording paper 7 paid out corresponds to the spacing between lines of the information recorded. Further, the starting torque of the motor 35 is promoted by the biasing force imparted to the scanning arm 41 in its returning direction, so that the motor 35 rapidly starts at the beginning of the recording operation.

Thus, the present invention overcomes many of the problems experienced in the prior art. It has been ascertained that the printer of this invention records more than five lines per minute. Further, as will be seen from the foregoing example, the printer of this invention is of extremely simple construction, which leads to the substantial reductions in size and in weight and enables mass production to curtail the manufacturing cost.

A description will be given of another embodiment of this invention which is smaller in size than the foregoing example. In FIGS. 15 to 18 a housing H included of a bottom plate 101 and side panels 102a, 102b and 102c vertically bent up from the bottom plate 101. A shaft 105 of a recording paper feed roller 104 is rotatably supported by the side panels 102a and 102b. The feed roller 104 is formed of a conductive rubber to serve as an electrode for the recording paper and is supplied with a current through a slip ring 106. A rolled recording paper 107 has centrally disposed shafts 108 and the recording paper is paid out by the feed roller 104 in the direction indicated by the arrow (in FIG. 15). A pair of arms 109 are rotatably mounted on a rotary shaft 110 and their free ends are fork-shaped to hold a roller shaft 108 therebetween. The arms 109 are biased clockwise by coiled springs 111 arranged between the arms and the side panels 102a and 102b respectively to push the recording paper roll 107 towards the feed roller 104 at all times. A pair of guide notches 112 are formed in the side panels 102a and 102b from their upper edges respectively to guide the roller shaft 108 towards the feed roller 104.

Reference numeral 113 indicates generally a recording head assembly (FIG. 15). A plurality of, for example, nine needle electrodes 114 are arranged side by side on a head 115 in the scanning direction thereof. The head 115 is secured to a sliding member 116 and a terminal plate 117 is attached to the outer side of the sliding member 116. Pins 118 are mounted on the terminal plate 117 and are interconnected to the separate needle by lead wires 119. The underside of the sliding member 116 has formed thereon a downwardly projecting but bent sliding portion 116a, a hole being formed in the free end of the sliding portion 116a in the scanning direction thereof. A similar hole is formed in the sliding member 116. These holes are slidably engaged with guide rods 120 and 121 respectively. The guide rod 121 is supported between tabs 122 of the side panels 102a and 102c. A support frame 123 of the recording head assembly 113 is pivotally mounted on the guide rod 121 at the tabs 122. The support frame 123 is U-shaped in cross-section and its arms are bent in the form of a shallow V. The upper free ends of the arms support the guide rod 120 therebetween. Consequently, the guide rods 120 and 121 are supported at the upper and lower end portions of the bent arms respectively. That is, the support frame 123 support the recording head assembly 113 with the guide rods 120 and 121 at the sliding member 116 and the sliding portion 116a respectively. Between the bent arms and the side panels 102a and 102c coiled springs 124 are provided respectively to push the recording head assembly 113 towards the recording paper roll 107, thereby to urge the needle electrodes 114 against the recording paper at a suitable pressure. The contact positions of the needle electrodes 114 with the recording paper roll 107 lie above the aforementioned feed roller 104 in FIG. 15, that is, near the end of the recording paper as indicated by 107a. With such an arrangement, the surface of the recording paper after recording information thereon is not stained by the feed roller 104 and the recording information can be observed immediately after recorded.

A rectangular window 125 is provided between the recording surface of the recording paper 107 and the needle electrodes 114 in the scanning direction of the head assembly 113, the window 125 being fixed at both ends to the side panels 102a and 102b. This window 125 is formed of, for example, a thin metal sheet and is designed so that at the termination of scanning the needle electrodes 114 slide a little on the frame of the window to clear off dust therefrom, ensuring that information is recorded distinctly by the subsequent recording. Further, the feed roller 104 is covered with a plate so as not to be stained by the dust.

Figure 19:
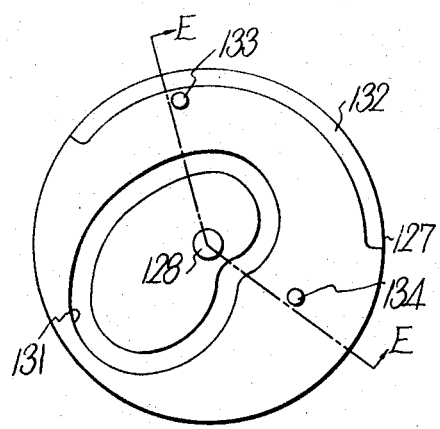
FIG. 19 is a plan view of a cam employed in the printer of FIG. 15.
Figure 20:
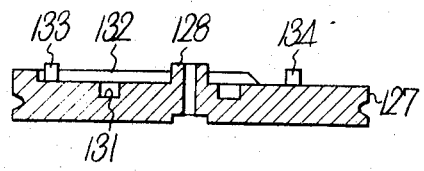
FIG. 20 is a cross-sectional view taken along the line E—E in FIG. 19.

A description will be given of a drive mechanism. A constant-speed drive motor 126 is provided which is supported by the side panel 102c and whose rotary shaft is supported by a bearing disposed on the bottom plate 101. A cam plate 127 is associated with the drive motor 126. The cam plate 127 is disc-shaped and formed of, for example, a plastic material, which plate has a rotary shaft disposed centrally thereof and is driven at a constant speed by the drive motor 126 through, for example, a belt 129 in a clockwise direction in FIG. 16. As shown in FIGS. 19 and 20, the cam plate 127 has formed therein first and second cams 131 and 132. The first cam 131 is in the form of a deformed heart-shaped groove and the second cam 132 is formed along the periphery of the cam plate 137 over an angular range of, for example, 155° in a manner not to be flush with the upper surface of the cam plate 127.

First and second arms 135 and 136 are provided in engagement with the first and second cams respectively. One end of a main side 138 of the first arm 135 is pivoted to a rotary shaft 137 and the other end is fixed to the underside of the sliding member 116 of the recording head assembly 113. Further, the first arm 135 has branch sides 139a, 139b and 139c which are arranged to form a trapezoid with the main side 138 near the rotary shaft 137 and a side 139d is obliquely branched out from the joint of the sides 139a and 139b. At the joint of the sides 139b and 139c a cam roller 140 is rotatably supported and engaged with the first cam 131 and pins 141 and 142 are mounted near the joint of the sides 139a and 139b and at the free end of the side 139d respectively. A third arm 143 described in detail later is pivoted to the pin 141 and a coiled spring 144 is provided between the pin 142 and the side panel 102c to bias the first arm 135 about the rotary shaft 137 clockwise in FIG. 16. Though not shown, lead wires for supplying signals to the needle electrodes 114 are led along the first arm 135 to the needle electrodes 114 from connecting terminal pins detachably mounted on the back of the printer, so that the lead wires move about the rotary shaft 137 following the motion of the needle electrodes 114. Accordingly, the lead wires need not be unnecessarily long and shall not be forcibly pulled. The first arm 135 is moved by the roller 140 engaged with the first cam 131 in such a manner that the recording head assembly 113 performs the recording motion (indicated by a solid line) and the returning motion (indicated by a broken line) over a distance d. Further, the second arm 136 carries a roller 145 at one end contacting the cam plate 127 and is rotatably supported at the other end by a pin 146 provided on the support frame 123 on the side of the side panel 102a. During the return stroke of the recording head assembly 113, the roller 145 is engaged with the second cam 132 to turn the support frame 123 against the biasing force of the coiled spring 124 in such a manner that the recording head assembly 113 is held out of contact with the recording paper 107. Accordingly, the angular range of the cam 132 is selected to comply with this. On the cam plate 127 magnets 133 and 134 are affixed (refer to FIGS. 19 and 20) for detecting the starting and terminating points of the recording stroke of the recording head assembly 113 respectively. That is, magnetosensitive elements are provided on a stationary part corresponding to the magnets respectively, though not shown. With pulses induced in circuits of the magnetosensitive elements, the initiation and termination of the recording are detected, according to which supply of signals to the needle electrodes 114 is controlled.

The following will describe a mechanism for feeding the recording paper 107. This mechanism includes a third arm 143, a ratchet wheel 147 and a pinion 148 attached to the feed roller shaft 105. The third arm 143 is coupled with a link arm 150 (FIGS. 16 and 17) pivoted to a rotary shaft 151 of the ratchet wheel 147 and a click 152 is mounted on the link arm 150. The click 152 is engaged with the ratchet wheel 147 to drive it at every rotation of the cam plate 127, that is, at every reciprocating motion of the third arm 143. Teeth 147a of the ratchet wheel 147 are meshed with the pinion 148 to drive the feed roller shaft 105 in a manner to feed the recording paper 107 by the length of one line for recording at every rotation of the cam plate 127, and accordingly at every completion of the recording stroke of the recording head assembly 113. On the ratchet wheel 147 a manual feeding knob 149 is mounted on the side of the side panel 102c and a pawl (not shown) is provided on the inside of the knob 149. By driving the ratchet wheel 147 with the pawl, the recording paper can be freely paid out. With such an arrangement, no trouble is caused in the automatic recording paper feed mechanism even by an accidental touch on the manual feeding knob 149 during operation of the printer.

In FIG. 17 a cover 200 for covering the housing H and a lever 201 for coupling the cover 200 with the housing H are provided. In this figure reference numeral 203 designates an upper panel, which is provided with a cutter 204 for cutting the recording paper 107.

While the foregoing has described the construction of the printer of the present example and the operations of its respective mechanisms, a description will be given of general recording operations. That is, the printer is associated with a computer, a drive motor 126 is connected to a power source and the recording head 113, the feed roller shaft 105 and the magnetosensitive elements are connected through connectors to respective signal terminals of the computer. The recording paper 107 is initially loaded in the recording device and is suitably paid out by turning the manual feeding knob 149. Then, the computer is operated to bring the printer in its recording conditon, in which a predetermined voltage si impressed to the recording paper 107 and, at the same time, the circuit of the motor 126 is closed. This operation is substantially the same as that of the foregoing embodiment. Further, in the present embodiment, when the recording head 113 starts recording from its starting point after the return stroke, the roller 145 of the second arm 136 disengages from the second cam 132 to urge the recording head 113 against the rolled recording paper 107, namely to bring the needle electrodes into contact with the recording paper 107 and, at the same time, signals are supplied to the needle electrodes 114 by a recording initiating signal induced in the magnetosensitive element corresponding to the magnet 133. The first arm 135 engages the first cam 131 to cause the recording head 113 to start its recording stroke. During the recording stroke, the needle electrodes 114 record information on the recording paper in accordance with the signals fed from the computer. At the end of the recording stroke a signal representing the completion of the recording is induced in the circuit of the magnetosensitive element corresponding to the magnet 134 to stop the supply of the recording signal from the computer. The first arm 135 then brings the recording head 113 in its return stroke corresponding to engagement of the first arm 135 with the first cam 131 and, at the same time, the second arm 136 engages the second cam 132 to turn the support frame 123 to disengage the recording head 113 from the recording paper 107. Following this, the third arm 143 pivoted to the pin 141 is brought towards the front of the printer (FIG. 16) corresponding to rocking of the side portion 139d of the first arm 135, by which the coupling portion of the third arm 143 with the link arm 150 is pushed down towards the underside of the ratchet wheel 147 to cause the pawl attached to the link arm 150 to turn the ratchet wheel 147 anticlockwise (as viewed in FIG. 16) by one step. As a result of this, the feed roller shaft 105 is turned by the pinion 148 to pay out the recording paper 107 by the length of one line. Thus, the recording head is returned to its starting point and thereafter the recording and return stroke of the recording head are repeatedly carried out in the same manner.

According to the present example, the first cam is so formed as to perform the recording motion at a uniform speed and during the return stroke the recording head is held out of contact with the recording paper to avoid distortion of the record and prolong the service life of the recording head. Further, since the lead wires of the recording head are arranged along the first arm, they are not unnecessarily pulled during the scanning operation of the recording head. In addition, the pawl is provided on the manual recording paper feeding knob, so that even if the operator accidentally touches the knob by hand, no trouble occurs. Furthermore, the printer can be simplified as a whole and can be reduced in size and in weight.

The present invention is not limited specifically to the foregoing examples and may be modified variously within the spirit of this invention. Of course, the present invention may be used with not only the electric recording system but also a heat recording system employing a heat-sensitive recording paper. Further, the present invention is applicable to recording apparatus of various instruments other than desk electronic computers and registers.

It will be apparent that many modifications and variations may be effected without departing from the scope of the novel concepts of this invention.

I claim as my invention:

1. A printer comprising a housing accommodating a recording medium wound on a roller shaft, means for feeding the recording medium in a predetermined direction, a drive source for driving the feeding means, a recording head means for recording information signals on the recording medium, means for causing the recording head means to scan the recording medium, and means for shifting the recording medium and the feeding means in opposite directions to bring them into contact with each other, wherein the drive source includes a rotatable first cam and the scanning means includes a first arm engaged with the first cam and connected to the recording head means, so that the recording head means is caused by the rotation of the first cam to perform a straight reciprocating motion through the first arm, and the drive source further includes a second cam and the scanning means also further includes a second arm engaged with the second cam and connected to the recording head means, so that the recording head means is brought by the rotation of the second cam into contact with the recording medium through the second arm during the forward motion of the recording head means and is brought out of contact with the recording medium during the reverse motion of the recording head means.

2. A printer as claimed in claim 1, wherein the recording head means comprises a support member slidably mounted on a rod fixed to the housing accommodating the recording medium and a recording head fixed to the support member, the first and second arms being coupled to the support member apart from the rod.

3. A printer comprising a housing, a first lever having one free end and one end pivoted on the housing, a recording medium, the recording medium being wound on a roller shaft which is removably mounted on the free end of the first lever, a cover pivoted on the housing along a substantially horizontal axis to cover the wound recording medium, the cover having a link lever pivoted at one end to the housing at a first point and connected by a guide pin at its other end to the free end of the first lever, theposition of the link lever being such that when the cover is in an open position a line extending from the guide pin to the first point passes beneath the horizontal axis about which the cover pivots on the housing, recording head means movably mounted on the housing, feed roller means mounted on the housing, and spring bias means for biasing the first lever in a direction toward the feed roller means and to the head means, such that when the cover is closed so as to cover the wound recording medium, the wound recording medium is engaged with the feed roller means and with the head means, and when the cover is opened the first lever is pulled by the link lever away from the feed roller means and locked in an open position by the weight of the cover so that the wound recording medium is retracted from engagement with the feed roller means and head means and can be taken out from the first lever.

4. A printer as recited in claim 3 wherein the housing is provided with guide notches to at least partially support the roller shaft on the recording medium and a second lever corresponding to the first lever is provided to contact an end of the roller shaft opposite to the first lever.

* * * * *